(No Model.)

R. W. TRAYLOR.
JOURNAL BEARING AND BOX.

No. 286,563.  Patented Oct. 9, 1883.

Witnesses.
Robert Everett.
J. A. Rutherford.

Inventor.
Robert W. Traylor.
By James L. Norris
Atty.

UNITED STATES PATENT OFFICE.

ROBERT W. TRAYLOR, OF RICHMOND, VIRGINIA.

JOURNAL BEARING AND BOX.

SPECIFICATION forming part of Letters Patent No. 286,563, dated October 9, 1883.

Application filed December 18, 1882. (No model.)

*To all whom it may concern:*

Be it known that I, ROBERT W. TRAYLOR, a citizen of the United States, residing at Richmond, Virginia, have invented new and useful Improvements in Journal Bearings and Boxes, of which the following is a specification.

This invention relates to improvements in the manufacture of bearings for journals, axles, shafts, and spindles, and has for its object to construct a bearing of such character that the material of which it is composed will in a measure be self-lubricating while it acts as a non-conductor of heat, is free from grit, and provides a smooth bearing-surface, while the process of manufacture produces a better and more substantial structure than bearings of like character made as heretofore.

To this end my invention consists in the method of constructing a bearing by forming sheets of mica into the required configuration and arranging such sheets side by side, subjecting them to powerful pressure, and, while compacted and under pressure, thrusting the mass into a box or receptacle which constitutes the casing of the bearing.

Figure 1:
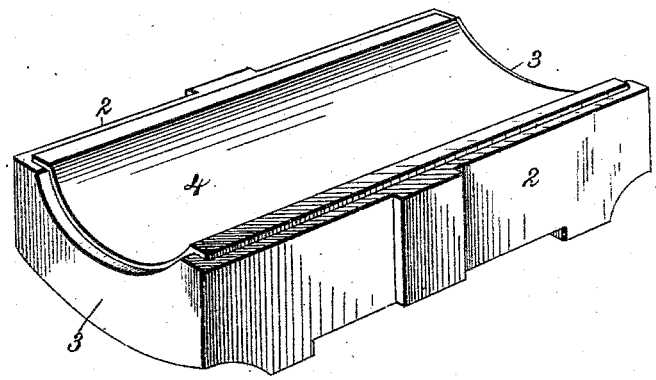
Figure 2:
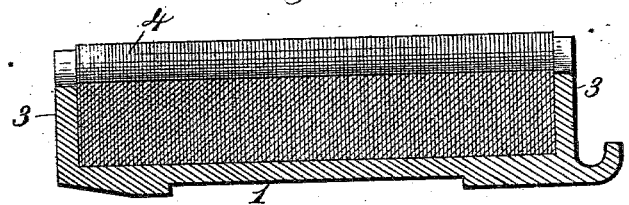
Figure 3:
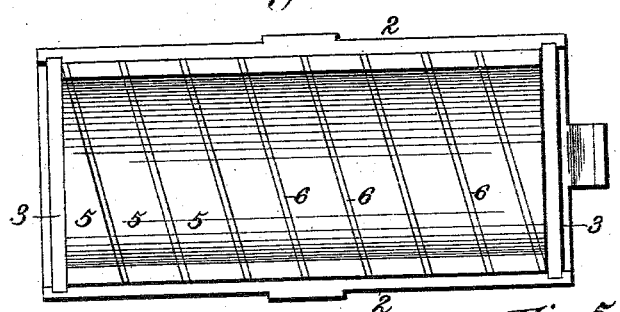
Figure 5:
Figure 4:
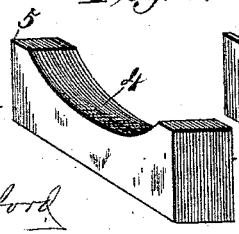

The invention is illustrated in the accompanying drawings, in which Figure 1 represents a perspective view of a bearing for journals or shafts constructed in accordance with my invention; Fig. 2, a longitudinal sectional view of the same; Fig. 3, a plan or top view; Fig. 4, a detached perspective view of several of the mica sheets compressed together, and one of the metal separating-plates represented in Fig. 3.

In carrying out my invention I provide a metallic or other suitable rigid receptacle or box, closed at its bottom 1, sides 2, and ends 3, and into this receptacle I arrange the bearing, first proceeding to construct the same in the following manner: I take a series of sheets of mica and bring each to the configuration required to produce a semicircular or similar shaped bearing-surface 4; then dampen with water and place all side by side, after which I subject the series of sheets to powerful pressure, preferably through the instrumentality of a hydraulic press. This compacts the sheets, and while so compacted and under pressure I thrust or force the mass into the receptacle or box before alluded to, which receptacle or box constitutes a casing for the bearing, as will be obvious.

In Figs. 1 and 2 the bearing is composed entirely of sheets of mica, while in Fig. 3 the bearing is made up of sheets of mica 5, and interposed separating-plates 6, preferably of soft metal, the object of which arrangement is to avoid rapid wearing of the mica, the metal, however, gradually wearing down, so that the mica bearing is at all times in uniform contact with the journal or shaft.

I have found that by dampening the sheets of mica with water I can more effectually compress them together, while by the edges of the sheets being exposed to constitute the bearing-surface the bearing is rendered exceedingly durable.

I am aware that it is not new to construct a journal-box with a bearing-surface of mica, and such, therefore, I do not claim.

Having thus described my invention, what I claim is—

The method herein described of making bearings of the character described, which consists in first forming a series of separate sheets of mica into the form required, placing the sheets side by side, subjecting the whole to powerful pressure, and, while compressed and under pressure, thrusting the mass into a box or receptacle which constitutes a casing for the bearing, substantially as described.

In testimony whereof I have hereunto set my hand in the presence of two subscribing witnesses.

R. W. TRAYLOR.

Witnesses:
JAMES L. NORRIS,
J. A. RUTHERFORD.